(12) United States Patent
Kamatani

(10) Patent No.: US 6,914,736 B2
(45) Date of Patent: Jul. 5, 2005

(54) MAGNETIC TRANSFER APPARATUS INCLUDING A HOLDER HAVING AT LEAST ONE FLEXIBLE FLAT PLATE PORTION

(75) Inventor: Akito Kamatani, Kanagawa-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 227 days.

(21) Appl. No.: 10/270,366

(22) Filed: Oct. 15, 2002

(65) Prior Publication Data

US 2003/0072096 A1 Apr. 17, 2003

(30) Foreign Application Priority Data

Oct. 15, 2001 (JP) .................................. 2001-316781

(51) Int. Cl.[7] ............................................. G11B 5/86
(52) U.S. Cl. ......................................................... 360/17
(58) Field of Search ............................. 360/15, 16, 17

(56) References Cited

U.S. PATENT DOCUMENTS 5,075,801 A * 12/1991 Chi et al. ..................... 360/17
6,347,016 B1   2/2002 Ishida

FOREIGN PATENT DOCUMENTS

| JP | 63-183623 | 7/1988 |
| JP | 7-78337 | 3/1995 |
| JP | 2000-67433 | 3/2000 |

* cited by examiner

Primary Examiner—Alan T. Faber
(74) Attorney, Agent, or Firm—Sughrue Mion, PLLC (57) ABSTRACT

A magnetic transfer apparatus includes a holder which contains therein a master information carrier carrying thereon information to be transferred and a slave medium to which the information born by the master information carrier is to be transferred. The master information carrier and the slave medium are pressed against each other under pressure acting on the holder when the holder is evacuated, and a transfer magnetic field is applied to the slave-medium-master-information-carrier assembly. The holder includes upper and lower holder portions having flat plate portions which are brought into abutment against the other side of the slave medium or the master information carrier and are movable toward and away from each other. At least one of the flat plate portions is flexible.

4 Claims, 5 Drawing Sheets

FIG.1

MAGNETIC TRANSFER APPARATUS INCLUDING A HOLDER HAVING AT LEAST ONE FLEXIBLE FLAT PLATE PORTION

BACKGROUND OF THE INVENTION

1. Field of the Invention

This invention relates to a magnetic transfer apparatus for magnetically transferring information on a master information carrier to a slave medium.

2. Description of the Related Art

In the magnetic transfer, the magnetization pattern representing the information (e.g., a servo signal) carried by a master information carrier is transferred from the master information carrier to a slave medium by applying a transfer magnetic field to the slave medium and the master information in close contact with each other, as disclosed, for instance, in Japanese Unexamined Patent Publication Nos. 63(1988)-183623, 10(1998)-40544 and 10(1998)-269566.

When the slave medium is a disc-like medium such as a hard disc or a flexible disc, a disc-like master information carrier is brought into close contact with one side or each side of the slave medium, and a transfer magnetic field is applied to the slave-medium-master-information-carrier assembly by a magnetic field application device disposed on one side or each side thereof. The magnetic field application device may comprise either an electromagnet or a permanent magnet.

In order to improve magnetic transfer quality, it is required to bring the slave medium and the master information carrier into a contact with each other as close as possible. When the close contact between the slave medium and the master information carrier is not satisfactory, information cannot be successfully transferred from the master information carrier to the slave medium, and local drop out occurs in parts where the information is not transferred, thereby deteriorating the quality of the signal recorded on the slave medium. In the case where the signal transferred is a servo tracking signal, the tracking function is deteriorated and the reliability deteriorates.

In conventional magnetic transfer apparatuses, the slave medium is mechanically pressed against the master information carrier in order to bring the slave medium into close contact with the master information carrier. Further, there have been known a magnetic transfer apparatus in which the former is pressed against the latter by way of an elastic material. (Japanese Unexamined Patent Publication No. 7(1995)-78337) The mechanisms where the slave medium is mechanically pressed against the master information carrier are disadvantageous in that it is difficult to press the slave medium and the master information carrier against each other under a uniform pressure, though advantageous in that a larger pressure can be obtained.

Further, there has been known, as disclosed in Japanese Unexamined Patent Publication No. 2000-67433, a mechanism where air between the slave medium and the master information carrier is evacuated in order to prevent air from being trapped therebetween and preventing close contact of them. However, this cannot allow the slave medium and the master information carrier to be pressed against each other under a uniform pressure.

When a vacuum contact system, where a holder containing therein the slave medium and the master information carrier is evacuated so that the slave medium and the master information carrier are pressed against each other under atmospheric pressure uniformly acting on the holder from outside, is employed, a uniform close contact of the slave medium and the master information carrier may be easily obtained since the atmospheric pressure uniformly acts on the entire area of the holder.

However, even if such a vacuum contact system is employed, it is difficult to obtain a uniform close contact of the slave medium and the master information carrier over the entire area thereof unless the atmospheric pressure uniformly acts on the entire area of the slave medium and the master information carrier through the holder. In order for the atmospheric pressure to uniformly act on the entire area of the slave medium, it is required that the slave medium and the master information carrier are highly flat and the upper and lower parts of the holder are highly parallel to each other. In the case that the holder is rigid, it is difficult in view of the quality control to constantly obtain such a high accuracy holder and it is disadvantageous in view of the cost to constantly obtain such a high accuracy holder. Unless the slave medium and the master information carrier are highly flat and the upper and lower parts of the holder are highly parallel to each other, the slave medium and the master information carrier cannot be uniformly in close contact with each other and local drop out can occur.

SUMMARY OF THE INVENTION

In view of the foregoing observations and description, the primary object of the present invention is to provide a magnetic transfer apparatus in which the slave medium and the master information carrier can be brought into a close contact each other over the entire area thereof, whereby quality of the signal transferred to the slave medium can be improved.

In accordance with the present invention, there is provided a magnetic transfer apparatus comprising a holder which contains therein a master information carrier carrying thereon information to be transferred and a slave medium to which the information carried by the master information carrier is to be transferred so that the master information carrier and the slave medium are opposed to each other with their one sides facing each other, a vacuum contact means which evacuates the holder so that the master information carrier and the slave medium are pressed against each other under pressure acting on the holder when the holder is evacuated, and a magnetic field application device which applies a transfer magnetic field to the slave-medium-master-information-carrier assembly, wherein the improvement comprises that the holder comprises upper and lower holder portions respectively having flat plate portions which are brought into abutment against the other side of the slave medium or the master information carrier and are movable toward and away from each other, and at least one of the flat plate portions is flexible.

When a piece of information is to be first transferred to one side of the slave medium and then another piece of information is to be transferred to the other side of the slave medium (will be referred to as "sequential transfer", hereinbelow), a slave medium and a master information carrier in contact with one side of the slave medium are contained in the holder, whereas, when a pair of pieces of information are to be simultaneously transferred to the opposite sides of the slave medium (will be referred to as "simultaneous transfer", hereinbelow), a slave medium and a pair of master information carriers in contact with opposite sides of the slave medium are contained in the holder. Each of the upper and lower holder portions has a flat plate portion which is brought into abutment against the back side of the slave medium or the master information carrier. In the magnetic transfer apparatus of the present invention, at least one of the flat plate portions is flexible and is deformed under atmospheric pressure, acting on the holder portion when the holder is evacuated, to uniformly press the slave medium and the master information carrier against each other, whereby the slave medium and the master information carrier are brought into a uniform close contact with each other.

The flat plate portion of the lower holder portion holding the back side of the master information carrier may be higher in rigidity than the flat plate portion of the upper holder portion brought into contact with the back side of the slave medium (or the master information carrier). For example, the lower holder portion is formed of a rigid material and the upper holder portion is formed of an elastic material or a soft material having flexibility so that the upper holder portion is deformed under suction force to bring the slave medium into a uniform close contact with the master information carrier. This arrangement is useful to prevent the master information carrier and/or the slave medium from being bowed under the pressure which presses the slave medium and the master information carrier against each other.

When the flat plate portion of the upper holder portion and/or the flat plate portion of the lower holder portion is small in thickness, the slave-medium-master-information-carrier assembly can be nearer to the head of the magnetic field application device and stronger magnetic field can be applied to the assembly, whereby magnetic transfer can be done with an optimal magnetic field distribution. When flexible, the flat plate portion may be smaller in thickness.

The flat plate portions are provided with an optimal rigidity by adjusting their Young's modulus, thickness and the like so that the slave medium and the master information carriers (s) are pressed against each other under predetermined uniform pressure when the holder is evacuated.

In the magnetic transfer apparatus in accordance with the present invention, the flexible flat plate portion is deformed under the pressure acting on the holder when the holder is evacuated so that the slave medium and the master information carrier are pressed against each other under uniform pressure, whereby the slave medium and the master information carrier are brought into a uniform close contact with each other and quality of the signal transferred to the slave medium can be improved. Further, since the holder can be smaller in thickness, the transfer magnetic field applied to the slave medium can be stronger.

Further, when one of the flat plate portions is flexible and the other flat plate portion is rigid, shift of the transfer position due to bow of the slave medium and the master information carrier can be avoided and deterioration in accuracy of the signal writing position due to wave of the master information carrier can be avoided.

DESCRIPTION OF THE PREFERRED EMBODIMENTS

Figure 1:
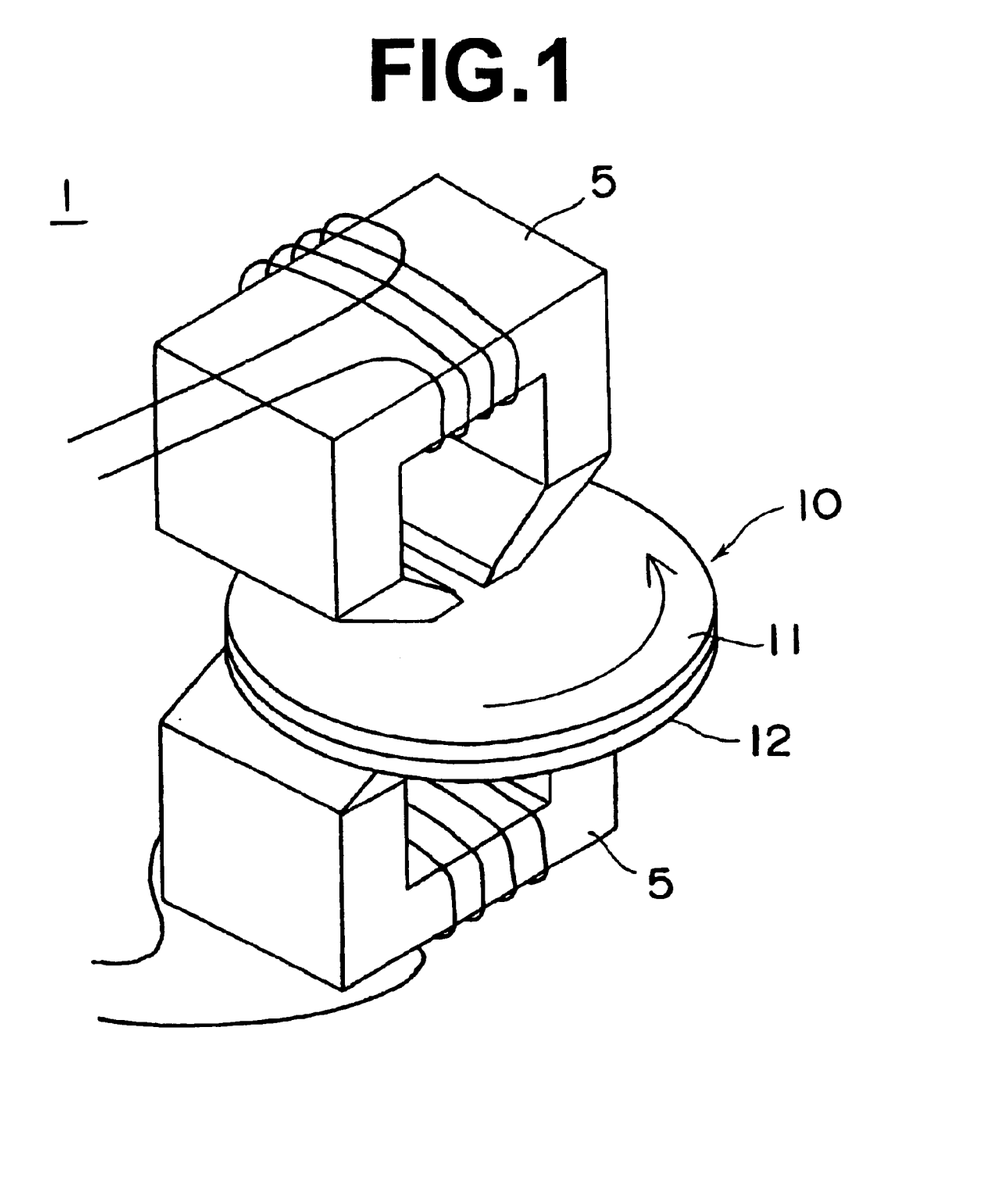
FIG. 1 is perspective view showing an important part of a magnetic transfer apparatus in accordance with an embodiment of the present invention.
Figure 2A:
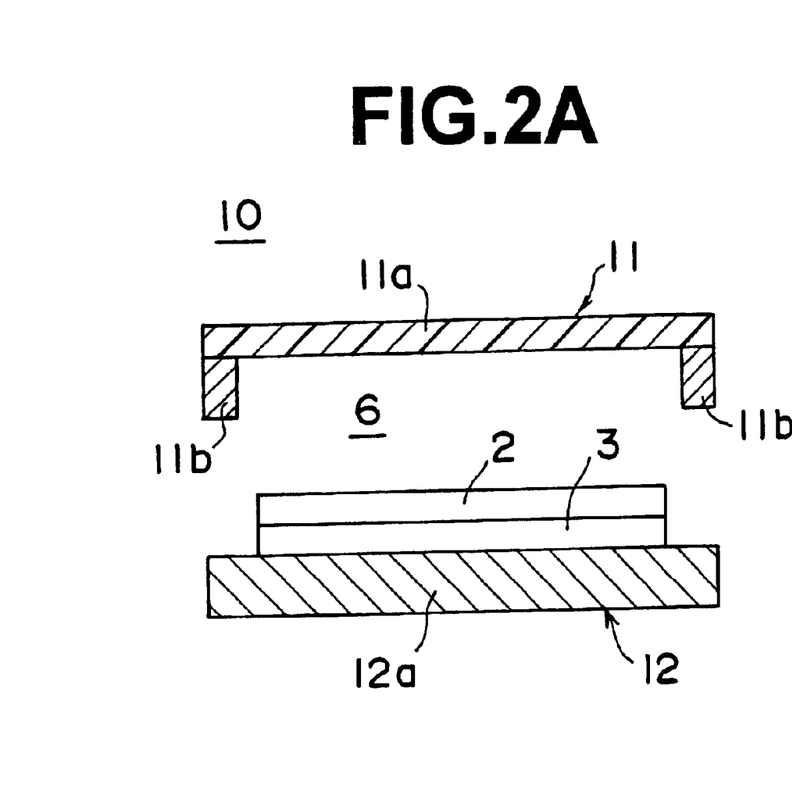
FIGS. 2A and 2B are cross-sectional views showing the operation of the holder employed in the magnetic transfer apparatus shown in FIG. 1, FIGS. 3A and 3B are cross-sectional views showing the operation of the holder of a modification.
Figure 2B:
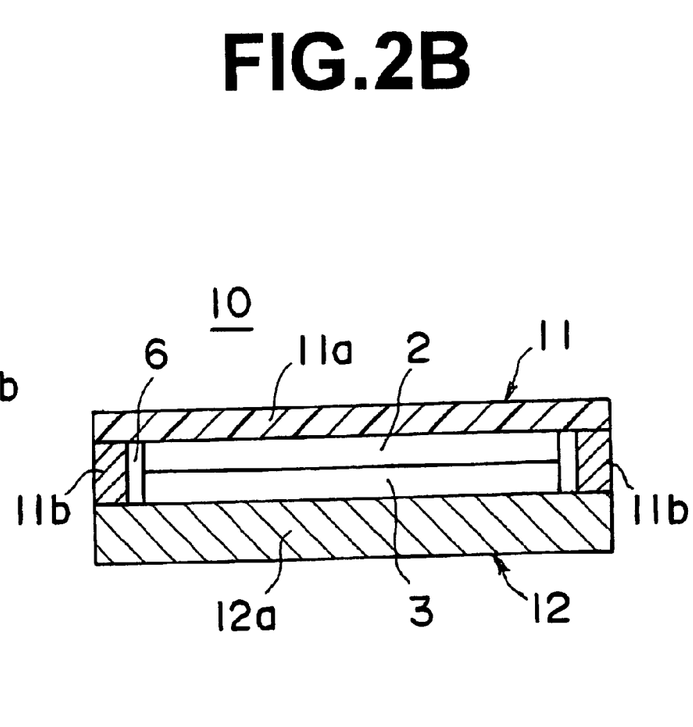

In FIG. 1, a magnetic transfer apparatus 1 in accordance with an embodiment of the present invention comprises a holder 10, a suction means (not shown) which evacuates the holder 10 so that a slave medium 2 and a master information carrier 3 are pressed against each other under atmospheric pressure acting on the holder 10, and a magnetic field application device 5 which applies a transfer magnetic field to a slave-medium-master-information-carrier assembly while rotating the holder 10. The holder 10 comprises upper and lower holder portions 11 and 12 which are opened and closed (moved away from and toward each other) and form an inner space 6 when closed. In the inner space 6, a slave-medium-master-information-carrier assembly comprising a slave medium 2 and a master information carrier 3 opposed to one side of the slave medium 2 with their centers aligned with each other or a slave medium 2 and a pair of master information carriers 3 opposed to the respective sides of the slave medium 2 with their centers aligned with each other is contained. When a piece of information is to be first transferred to one side of the slave medium 2 and then another piece of information is to be transferred to the other side of the slave medium 2, the slave-medium-master-information-carrier assembly comprises a slave medium 2 and a master information carrier 3 opposed to one side of the slave medium 2 and when a pair of pieces of information are to be simultaneously transferred to the both sides of the slave medium 2, the slave-medium-master-information-carrier assembly comprises a slave medium 2 and a pair of master information carriers 3 opposed to the respective sides of the slave medium 2. FIGS. 2A and 2B shows the former case. The expression "opposed to each other" should be broadly interpreted to include the cases where the members are in contact with each other and the cases where the member are opposed to each other with a small space intervening therebetween.

The lower holder portion 12 of the holder 10 is like a disc and is provided with a flat plate portion 12a which is brought into contact with the back side (lower side) of the master information carrier 3. The master information carrier 3 may be held on the flat plate portion 12a under suction force. The upper holder portion 11 is like a disk and is provided with a lower surface. The lower surface of the upper holder portion 11 is provided with peripheral wall portion 11b and a flat plate portion 11a inside the peripheral wall portion 11b. The flat plate portion 11a is brought into contact with the upper side of the slave-medium-master-information-carrier assembly (the upper side of the slave medium 2 when the slave-medium-master-information-carrier assembly includes a single master information carrier 3 and the upper side of the master information carrier 3 when the slave-medium-master-information-carrier assembly includes a pair of master information carriers 3).

The flat plate portion 11a of the upper holder portion 11 is formed of elastic material or soft material and has flexibility. The flat plate portion 11a deforms under the pressure acting under vacuum (FIG. 2B) so that the pressure uniformly presses the slave medium 2 and the master information carrier(s) 3. Whereas, the peripheral wall portion 11b of the upper holder portion 11 and the flat plate portion 12a of the lower holder portion 12 are formed of rigid material.

The flat plate portion 11a is formed of a material such as metal, synthetic resin or rubber which is elastic and impermeable to gases or a material such as a vinyl sheet which is soft and impermeable to gases. The flat plate portion 11a is provided with an optimal rigidity by adjusting its Young's modulus, thickness and the like so that the slave medium 2 and the master information carriers (s) 3 are pressed against each other under a uniform pressure when the holder 10 is evacuated.

As the flat plate portion 11a of the upper holder portion 11 and the flat plate portion 12a of the lower holder portion 12a are reduced in thickness thereof, the slave-medium-master-information-carrier assembly can be held nearer to the magnetic head of the magnetic field application device 5 and the transfer magnetic field applied to the slave-medium-master-information-carrier assembly becomes stronger, whereby the magnetic transfer can be done with an optimal magnetic distribution.

In a state where the holder 10 is closed, that is, when an inner space 6 is formed between the upper and lower holder portions 11 and 12, the lower end face of the peripheral wall portion 11b of the upper holder portion 11 is in abutment against the upper surface of the flat plate portion 12a of the lower holder portion 12 with a seal member (not shown) intervening therebetween so that the inner space 6 is closed in a vacuum-tight (air-tight) fashion and the slave medium 2 and the master information carrier(s) are pressed against each other under suction force when the holder 10 is evacuated. The upper holder portion 11 and the lower holder portion 12 are rotated integrally with each other by a rotating mechanism (not shown).

The suction means not shown is provided with a suction port which opens, for instance, in the flat plate portion 12a of the lower holder portion 12 in a position outside the peripheral edge of the slave-medium-master-information-carrier assembly, and an air passage which connects the suction port to a vacuum pump. The suction means evacuates the holder 10 to a predetermined degree of vacuum, thereby controlling the pressure under which the slave medium 2 and the master information carrier 3 are pressed against each other.

Prior to magnetic transfer, the slave medium 2 is subjected to initial DC magnetization in the direction of the in-plane track in the case of recording the information by in-plane recording or in a direction perpendicular to the surface of the slave medium 2 in the case of recording the information by perpendicular recording. With the slave medium 2 and the master information carrier(s) held in a close contact with each other, magnetic transfer is carried out by applying a transfer magnetic field in a direction substantially opposite to the direction of the initial DC magnetization. As the slave medium 2, a disc-like magnetic recording medium such as a hard disc or a high-density flexible disc having a magnetic layer on one side or opposite sides thereof is used.

The master information carrier 3 is in the form of a disc. The master information carrier 3 comprises a substrate which is provided on one side thereof with an embossed pattern (a pattern of fine irregularities) which is coated with soft magnetic material and represents information (this side will be referred to as "information carrier side" hereinbelow), and is brought into abutment against the slave medium 2 with the information carrier side facing the slave medium 2 and the other side facing the upper or lower holder portions 11 or 12.

The substrate of the master information carrier 3 may comprise, for instance, nickel, silicon, quartz, glass, aluminum, alloy, ceramics, or synthetic resin. The embossed pattern on the substrate of the master information carrier 3 may be formed, for instance, by stamping. The coating of soft magnetic material may be formed, for instance, by a vacuum film making process or a plating process such as vacuum deposition, sputtering or ion plating. Substantially the same master information carrier can be used for both in-plate recording and perpendicular recording.

In the case of in-plane recording, the magnetic field application device 5 comprises a ring-like electromagnetic head, comprising a core having a gap extending in a radial direction of the slave medium 2 and a winding wound around the core, disposed on the upper or lower side of the slave medium. In place of the electromagnetic head, a permanent magnetic head may be used. The magnetic field application device 5 may be disposed either on one side of the slave medium or on both sides of the same. In the latter case, transfer magnetic fields which are the same in direction and parallel to the direction of the track are applied to the slave medium 2 above and below the same. By rotating the holder 10, containing therein the slave-medium-master-information-carrier assembly, relatively to the magnetic field application device(s) 5 or by rotating the latter relatively to the former, the transfer magnetic field is applied to the slave medium 2 and the master information carrier(s) 2 over the entire area thereof.

In the case of perpendicular recording, a pair of electromagnets or permanent magnets which are different in polarity are disposed respectively on the upper and lower sides of the holder 10 and a transfer magnetic field is established across the holder 10 in perpendicular to the surface of the holder 10. When such a transfer magnetic field is locally established, the transfer magnetic field is applied to the slave medium 2 and the master information carrier(s) 2 over the entire area thereof by moving the holder 10 relatively to the magnetic field or by moving the latter relatively to the former.

In the magnetic transfer apparatus 1, information born by a single master information carrier 3 is transferred to a plurality of slave media 3. As shown in FIG. 2A, a slave medium 2, which has been initial-DC-magnetized, is located with respect to a master information carrier 3 held in place on the lower holder portion 12 and placed thereon with the holder 10 opened, that is, with the upper and lower holder portions 11 and 12 held apart from each other. Then the holder 10 is closed.

In this state, the slave medium 2 and the master information carrier 3 are contained in the holder 10, and the peripheral wall portion 11b of the upper holder portion 11 abuts against the upper surface of the lower holder portion 12, thereby closing the inner space 6 of the holder 10 in a vacuum-tight fashion, as shown in FIG. 2B. Then, the suction means evacuates air in the inner space 6 to a predetermined degree of vacuum. By this, the flat plate portion 11a is deformed by atmospheric pressure acting thereon according to the degree of vacuum in the holder 10 and uniformly presses the slave medium 2 and the master information carrier 3 against the lower holder portion 12, whereby the slave medium 2 and the master information carrier 3 are brought into a close contact with each other under a uniform pressure.

Then the upper and lower magnetic field application devices 5 are moved toward the upper and lower sides of the holder 10 and the transfer magnetic field is applied in a direction substantially opposite to the direction of the initial DC magnetization with the holder 10 rotated, whereby the information born by the master information carrier 3 is recorded on the slave medium 2 as a magnetization pattern.

The transfer magnetic field is absorbed in the protruding portion of the embossed pattern on the master information carrier 3 in close contact with the slave medium 2. In the case of in-plane recording, the initial magnetization of the part of the slave medium 2 in contact with the protruding portion of the embossed pattern is not reversed but the initial magnetization of the other part of the slave medium 2 is reversed, whereas in the case of perpendicular recording, the initial magnetization of the part of the slave medium 2 in contact with the protruding portion of the embossed pattern is reversed and the initial magnetization of the other part of the slave medium 2 is not reversed, whereby a magnetization pattern corresponding to the embossed pattern on the master information carrier 3 is recorded on (or transferred to) the slave medium 2.

In the particular embodiment described above, the flat plate portion 11a of the upper holder portion 11 is flexible and is deformed by atmospheric pressure upon evacuation of the holder 10 to uniformly presses the back surface of the slave medium 2 over the entire area thereof, whereby a uniform close contact of the slave medium 2 and the master information carrier 3 can be obtained and defective transfer due to unsatisfactory close contact of the slave medium 2 and the master information carrier 3 can be avoided.

Especially, when the flat plate portion 12a of the lower holder portion 12 which supports the back side of the master information carrier 3 is higher in rigidity than the flat plate portion 11a of the upper holder portion 11 which is brought into abutment against the back side of the slave medium 2, the master information carrier 3 can be held flat by the rigid flat plate portion 12a, whereby shift of the transfer position due to bow of the slave medium 2 and the master information carrier 3 can be avoided and deterioration in accuracy of the signal writing position due to wave of the master information carrier 3 can be avoided.

Figure 3A:
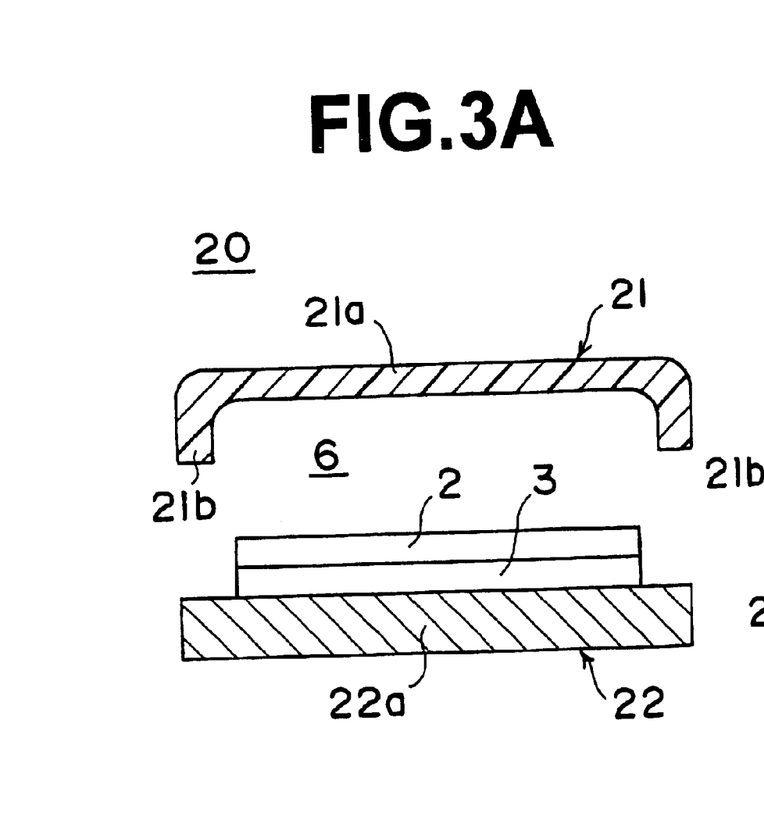
Figure 3B:
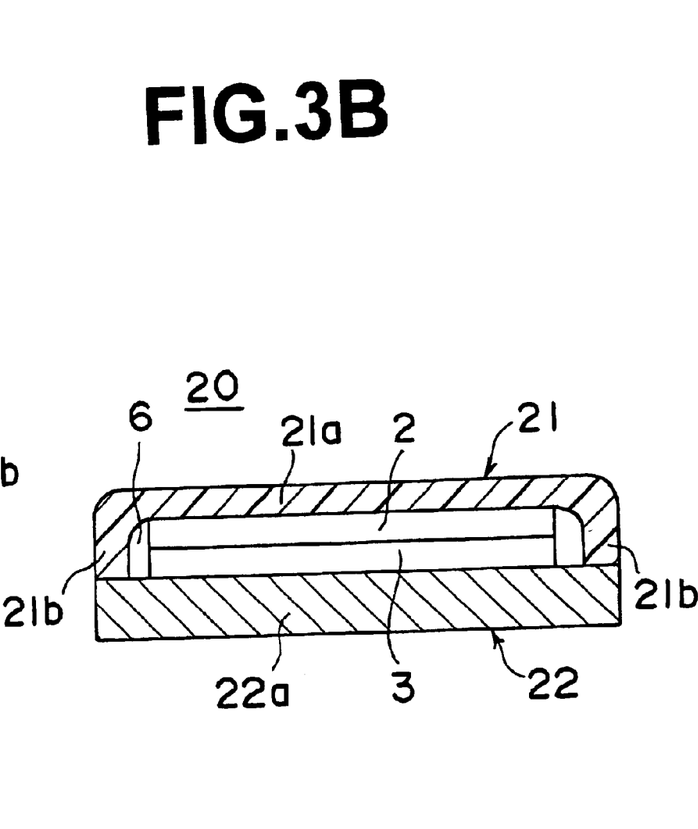

FIGS. 3A and 3B are views showing a modification of the holder. The holder 20 of this modification differs from the holder 10 employed in the magnetic transfer apparatus in accordance with the embodiment described above in that the peripheral wall portion 21b of the upper holder portion 21 is formed of an elastic material or a soft material to be flexible in addition to the flat plate portion 21a of the upper holder portion 21. The flat plate portion 22a of the lower holder portion 22 is rigid as the flat portion 12a of the lower holder portion 12 of the holder 10 employed in the magnetic transfer apparatus in accordance with the embodiment described above.

Though the holder 20 of this modification basically operates in the same manner as the holder 10 in the magnetic transfer apparatus in accordance with the embodiment described above, the upper holder portion 21 can be deformed more largely since the peripheral wall portion 21b is also flexible in this modification, and accordingly, this modification is more useful when the difference between the total thickness of the slave-medium-master-information-carrier assembly and the height of the peripheral wall portion 21b.

Figure 4A:
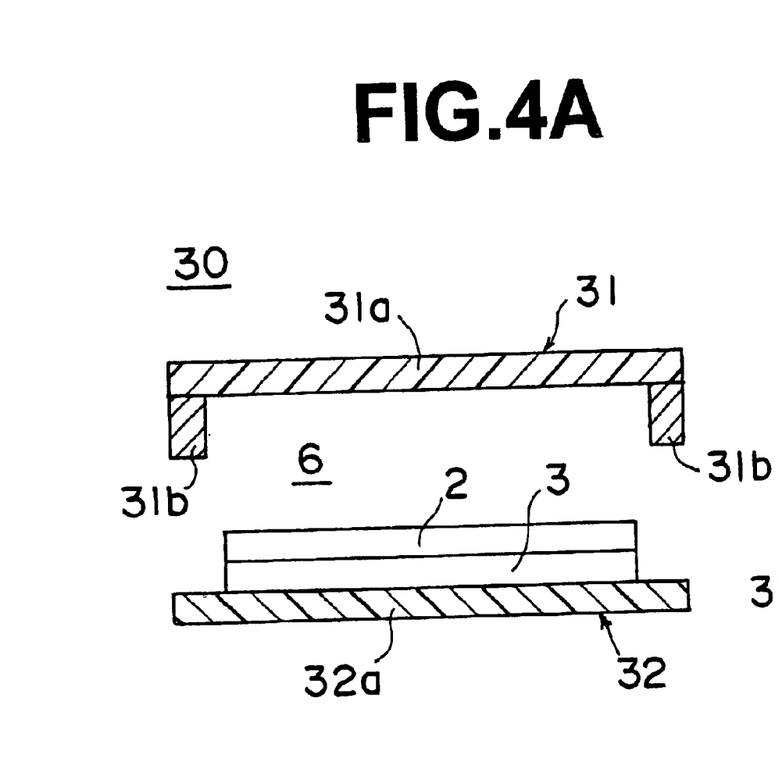
FIGS. 4A and 4B are cross-sectional views showing the operation of the holder of another modification.
Figure 4B:
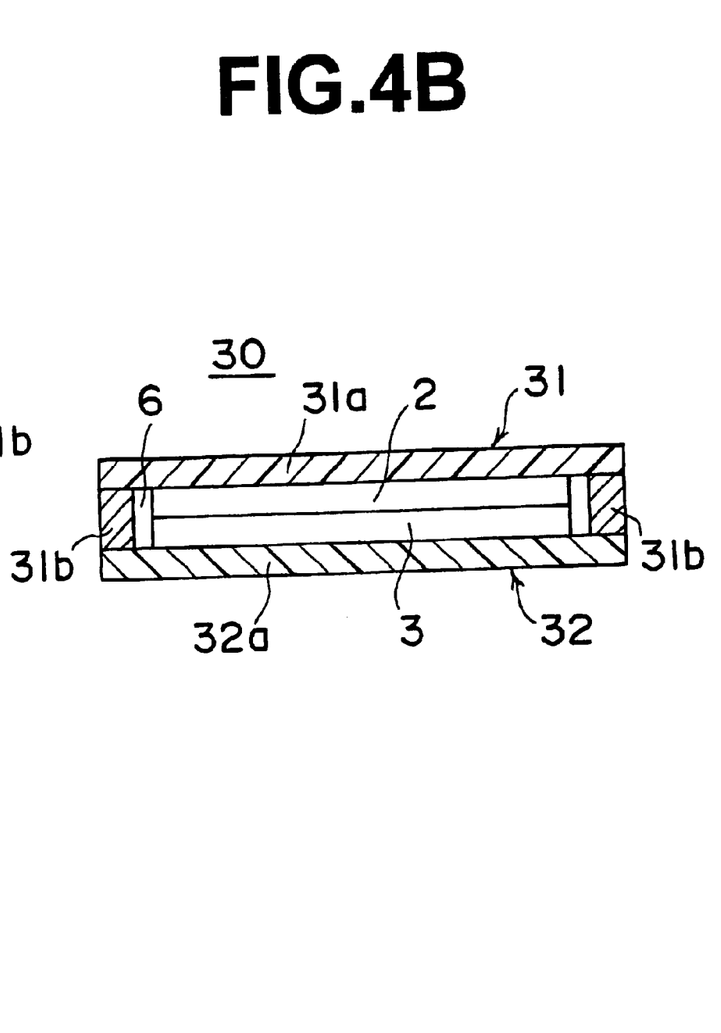

FIGS. 4A and 4B are views showing another modification of the holder. The holder 30 of this modification differs from the holder 10 employed in the magnetic transfer apparatus in accordance with the embodiment described above in that the flat plate portion 32a of the lower holder portion 32 is formed of an elastic material or a soft material to be flexible in addition to the flat plate portion 31a of the upper holder portion 31. The peripheral wall portion 31b of the upper holder portion 31 is rigid.

The holder 30 of this modification basically operates in the same manner as the holder 10 in the magnetic transfer apparatus in accordance with the embodiment described above, and is useful when the flatness of the master information carrier 3 and the slave medium 2 is ensured to some extent. In this modification, the flat plate portion 32a of the lower holder portion 32 may be thinner so that a stronger transfer field can be applied to the slave-medium-master-information-carrier assembly, and accordingly, this modification is more useful for the perpendicular recording where a magnet is to be disposed on opposite sides of the slave-medium-master-information-carrier assembly.

Figure 5A:
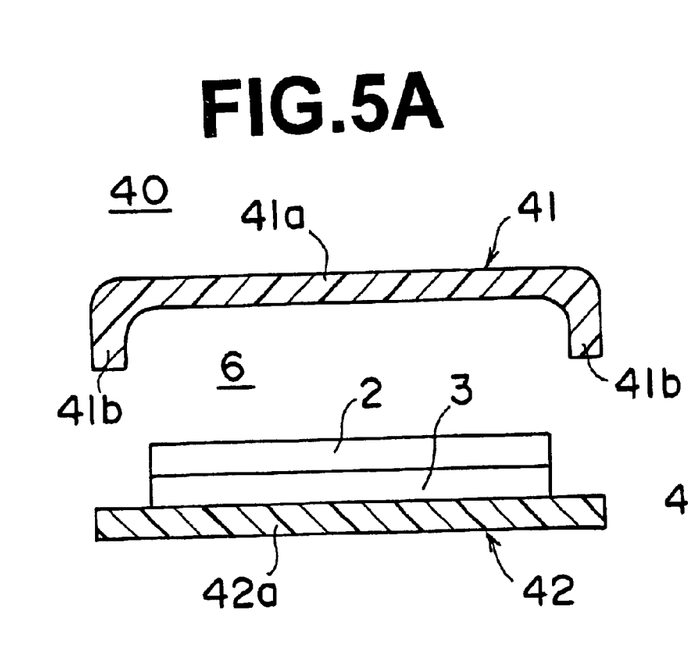
FIGS. 5A and 5B are cross-sectional views showing the operation of the holder of still another modification.
Figure 5B:
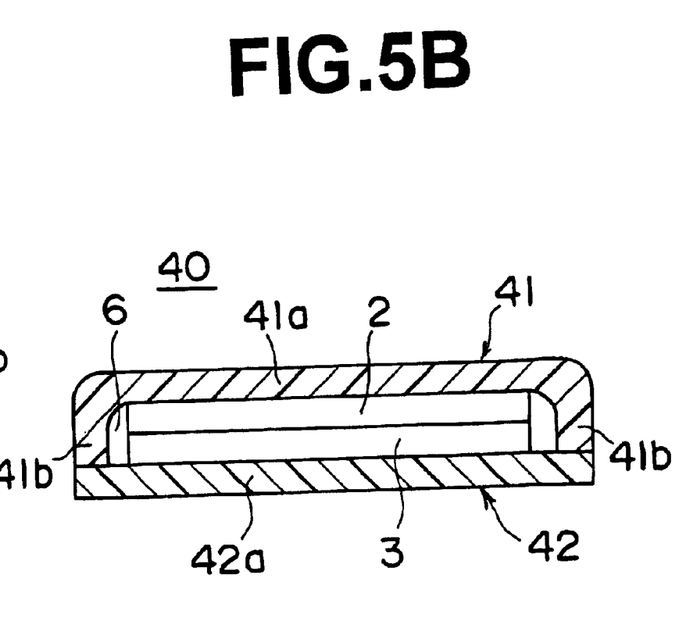

FIGS. 5A and 5B are views showing still another modification of the holder. The holder 40 of this modification differs from the holder 10 employed in the magnetic transfer apparatus in accordance with the embodiment described above in that the peripheral wall portion 41b of the upper holder portion 41 and the flat plate portion 42a of the lower holder portion 42 are formed of an elastic material or a soft material to be flexible in addition to the flat plate portion 41a of the upper holder portion 41.

The holder 40 of this modification basically operates in the same manner as the holder 10 in the magnetic transfer apparatus in accordance with the embodiment described above, and is useful when the flatness of the master information carrier 3 and the slave medium 2 is ensured to some extent. In this modification, the flat plate portion 42a of the lower holder portion 42 may be thinner so that a stronger transfer field can be applied to the slave-medium-master-information-carrier assembly.

In order to prevent air from being trapped between the flat plate portion of the upper holder portion and the slave medium (or the master information carrier), an air groove may be formed in the contact area therebetween, that is, in the surface of the flat plate portion and/or the surface of the slave medium (or the master information carrier) to be brought into contact with the flat plate portion.

In the case of the "simultaneous transfer", both the flat plate portions of the upper and lower holder portions are brought into abutment against the master information carrier. Also, in this case, a uniform close contact of the slave medium and the master information carrier can be obtained when at least one of the flat plate portions of the upper and lower holder portions is flexible.

What is claimed is:

1. A magnetic transfer apparatus comprising a holder which contains therein a master information carrier carrying thereon information to be transferred and a slave medium to which the information born by the master information carrier is to be transferred so that the master information carrier and the slave medium are opposed to each other with their one sides facing each other, a vacuum contact means which evacuates the holder so that the master information carrier and the slave medium are pressed against each other under pressure acting on the holder when the holder is evacuated, and a magnetic field application device which applies a transfer magnetic field to the slave-medium-master-information-carrier assembly, wherein the improvement comprises that:

the holder comprises upper and lower holder portions respectively having flat plate portions which are brought into abutment against the other side of the slave medium or the master information carrier and are movable toward and away from each other, at least one of the flat plate portions is flexible, and the at least one flexible flat plate portion is disposed in the magnetic transfer apparatus such that it is deformed by the pressure acting on the holder when the holder is evacuated.

2. A magnetic transfer apparatus as defined in claim 1 in which a slave medium and a pair of master information carriers are contained in the holder with one side of one of the master information carriers opposed to one side of the slave medium and one side of the other master information carrier opposed to the other side of the slave medium.

3. A magnetic transfer apparatus comprising a holder which contains therein a master information carrier carrying thereon information to be transferred and a slave medium to which the information born by the master information carrier is to be transferred so that the master information carrier and the slave medium are opposed to each other with their one sides facing each other, a vacuum contact means which evacuates the holder so that the master information carrier and the slave medium are pressed against each other under pressure acting on the holder when the holder is evacuated, and a magnetic field application device which applies a transfer magnetic field to the slave-medium-master-information-carrier assembly, wherein the improvement comprises that:

the holder comprises upper and lower holder portions respectively having flat plate portions which are brought into abutment against the other side of the slave medium or the master information carrier and are movable toward and away from each other, and at least one of the flat plate portions is flexible, in which the flat plate portion of one of the lower holder portion and the upper holder portion is more rigid than the flat plate portion of the other holder position.

4. A magnetic transfer apparatus comprising a holder which contains therein a master information carrier carrying thereon information to be transferred and a slave medium, to which the information born by the master information carrier is to be transferred so that the master information carrier and the slave medium are opposed to each other with their one sides facing each other, a vacuum contact means which evacuates the holder so that the master information carrier and the slave medium are pressed against each other under pressure acting on the holder when the holder is evacuated, and a magnetic field application device which applies a transfer magnetic field to the slave-medium-master-information-carrier assembly, wherein the improvement comprises that:

the holder comprises upper and lower holder portions respectively having flat plate portions which are brought into abutment against the other side of the slave medium or the master information carrier and are movable toward and away from each other, and at least one of the flat plate portions is flexible.

in which the rigidity of the flat plate portions of the upper and lower holder portions is set by adjusting their Young's modulus and thickness so that the slave medium and the master information carrier(s) are pressed against each other under predetermined uniform pressure when the holder is evacuated.

* * * * *